Figure 4:
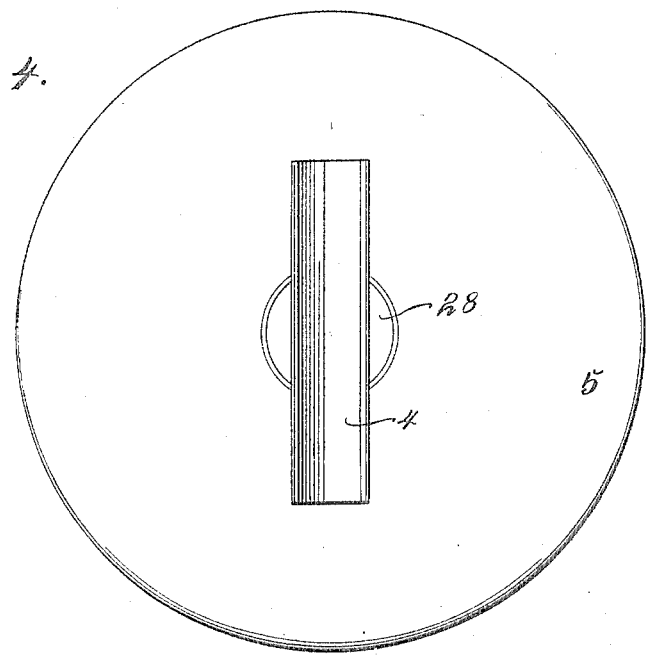

No. 802,219. PATENTED OCT. 17, 1905.
A. KLEINMAN & H. TOLKE.
REEL.
APPLICATION FILED APR. 22, 1905.
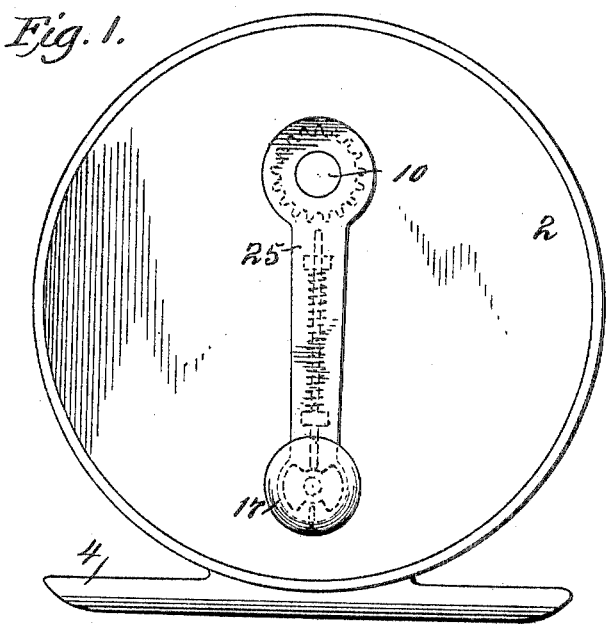
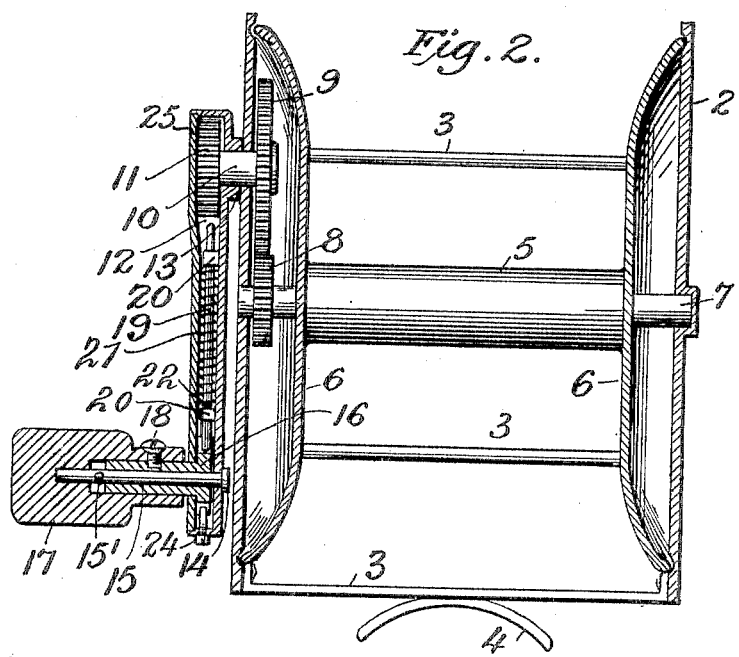
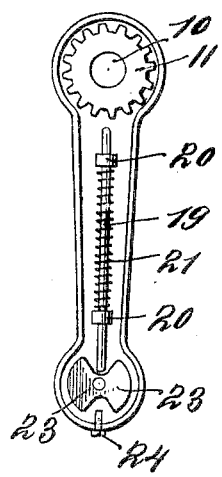
Witnesses
James F. Duhamel
Arthur L. McNeil
Inventors,
Asher Kleinman and
Hugo Tolke,
By their Attorneys
Davids & Wells No. 802,219. PATENTED OCT. 17, 1905.
A. KLEINMAN & H. TOLKE.
REEL.
APPLICATION FILED APR. 22, 1905.

2 SHEETS—SHEET 2.

WITNESSES:
James P. Duhamel.
Arthur L. McNeil.

INVENTORS,
Asher Kleinman &
Hugo Tolke,
BY their ATTORNEYS
Davids & Wells.

UNITED STATES PATENT OFFICE.

ASHER KLEINMAN AND HUGO TOLKE, OF NEW YORK, N. Y.; SAID TOLKE ASSIGNOR TO SAID KLEINMAN.

REEL.

No. 802,219.      Specification of Letters Patent.      Patented Oct. 17, 1905.

Application filed April 22, 1905. Serial No. 256,842.

*To all whom it may concern:*

Be it known that we, ASHER KLEINMAN and HUGO TOLKE, citizens of the United States, and residents of the borough of Manhattan, city and State of New York, have invented a new and useful Improvement in Reels, of which the following is a specification.

This invention provides a simple and economical construction for reels, such as those designed for holding fishing-lines, and it furnishes a device of this character in which with a few simple parts the rotary member or spool of the reel can be automatically connected with and disconnected from the operating-crank. In winding up a line on the spool of such a reel it is of course necessary that the positive rotation of the spool shall accompany the positive revolution of the hand-crank; but in the operation of casting off it is desirable that the spool shall be disconnected from the crank in order that the former may the more freely rotate in consequence of not acting as a driver for revolving the crank and actuating the connecting mechanism.

This invention establishes a connection assuring the positive movement aforesaid through a slight twist or angular movement given to the crank-handle during the initial revolving of the crank when first grasped by the hand of the operator and thereafter during the continued movement of the crank, as in winding of the line, operative connection is maintained, the fingers of the operator slipping over the surface of the handle. Immediately upon the release of the handle it returns automatically to its normal position relatively to the crank operative connection between the crank, and the spool is thereby broken and the spool is free to rotate without revolving the crank.

In the drawings accompanying the specification the invention is set forth in a multiplying-reel of that character known as a "metal" reel and also of that character designated as a "wooden" reel.

Figure 5:
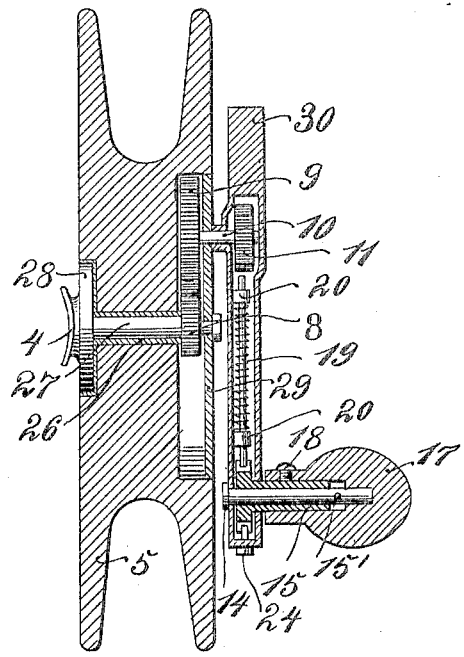

Figure 1 is an elevation of a metal reel embodying our invention. Fig. 2 is a sectional view thereof, the plane of the section being taken through the axis of the spool and illustrates the crank and crank-handle in section, part, however, being shown in elevation. Fig. 3 is a view of the crank with the cover of the crank-casing removed. Fig. 4 is a view similar to Fig. 1 of a so-called "wooden" reel. Fig. 5 is a cross-section taken through the spool-axis.

Similar characters of reference designate corresponding parts in all figures.

In the illustrated application of the invention to both the so-called "metal" and "wooden" reels the same is shown as embodied in a reel of the multiplying type—that is, one in which a single revolution of the crank produces more than one rotation of the spool—although obviously the improvements are applicable to other types and styles of reels.

Referring at the outset to the form illustrated in Figs. 1, 2, and 3, 2 2 designate the side frames of the reel connected together by cross-rods 3 and having the usual curved foot or base piece 4, by means of which the reel may be connected to a fishing-rod. The spool comprises the usual center 5, having at its ends disks 6 6, whose axle or shaft 7 is suitably mounted in the side frames 2 2. Rigid with the axle 7 is a gear 8, meshing with a companion gear 9 of larger diameter and constituting with the former a multiplying gear-train. Shaft 10 of gear 9 is mounted in one of the side frames 2 and carries a notched wheel 11, located within a hollow crank 12, whose hub 13 is rotatably mounted on shaft 10. It is evident from this construction that if the crank is held rigid with the notched wheel 11 the act of revolving the crank will rotate the spool, while if the shaft of the notched wheel is free to rotate in the hub of the crank the spool of the reel will not during its rotation be accompanied by or cause the revolving of the crank.

Simple means are illustrated in which the normal or free condition of the parts maintains the notched wheel disconnected from the crank, but which when the handle of the crank is grasped by the operator and held sufficiently tight to slightly rotate the handle when the revolution of the crank is begun causes the angular displacement of the handle (relatively to the crank) to automatically connect the notched wheel to the crank.

Adjacent to the free end of the crank is a stem or post 14, on which is rotatively mounted a cam-sleeve 15, rigid with which is a cam 16, located within the hollow crank. The handle or finger-piece of the crank (designated by 17) is fitted over post 14 and cam-sleeve 15, being secured to the latter by means such as a screw 18. A pin 15' prevents the handle and cam-sleeve from sliding lengthwise of the post. In operative relation with cam 16 is a slide or plunger 19, slidably mounted in guides 20 20 and encircled by a spring 21, interposed between one of the guides 20 and a cross-pin 22 and whose tension is such as to tend to hold the end of the slide 19 away from the notched wheel 11. Cam 16 has a notch for the reception of the contiguous end of the slide or plunger 19, this notch having inclined side walls 23 23. The cam will, when the cam-sleeve and the attached crank-handle are turned in either direction, force the plunger or slide 19 forward and engage the same with the notched wheel. Thus as long as the handle is held in such relative position the revolution of the crank rotates the spool of the reel. The angular movement of the cam in both directions is limited by a stop, such as 24, which prevents the plunger from passing beyond the inclined walls of the cam. During the further continued revolution of the crank the handle (maintained in one of its limiting positions by the stop 24) slips through the fingers of the operator, but accomplishes the positive rotation of the spool, disengagement automatically occurring, however, upon the release of the handle.

The assembling of the parts is facilitated by providing the hollow-crank with a detachable cover 25.

Referring to the construction set forth in Figs. 4 and 5, a so-called "wooden" reel is therein illustrated, 5' designating a wooden spool, rigid with which is a bushing or thimble 26, through the bore of which extends a pin or fixed shaft 27, secured to side plates or disks 28 and 29, respectively. These disks are preferably let into the recesses in the radial faces of the spool. To the disk 28 there is attached the usual curved foot or base piece 4. Gear-wheel 8 in this instance is rigid with the bushing or thimble 26 and meshes with the larger companion gear 9, whose shaft 10 is rotatably mounted in disk 29. The crank, its operating-handle, and the clutch construction is essentially the same as that already described. It need not, therefore, be again referred to in detail. In Fig. 5, however, the crank is shown as provided with a counterbalance 30, with which the handle in the construction set forth in Figs. 1, 2, and 3 may be provided when desired.

Having described our invention, we claim—

1. In a reel, the combination with a spool and a notched wheel in operative connection therewith, of a crank, a handle mounted to turn upon the crank, a cam rigid with the handle and adapted to have a limited angular movement, a plunger interposed between the cam and the notched wheel, and a spring for withdrawing said plunger from and holding it out of engagement with the notched wheel.

2. In a reel, the combination with a spool and a notched wheel in operative connection therewith, of a crank within which the notched wheel is located, a handle mounted to turn upon the crank, means for limiting the angular movement of the handle with reference to the crank, a cam operative from the angular movement of the handle, a plunger interposed between the cam and the notched wheel, and a spring for withdrawing said plunger from and holding it out of engagement with the notched wheel.

3. The combination with a spool and a notched wheel, of a multiplying gear-train between the notched wheel and the spool, a crank, a handle mounted to turn upon the crank, means for limiting the angular movement of the handle with reference to the crank, a cam operative from the angular movement of the handle, a plunger interposed between the cam and the notched wheel, and a spring for withdrawing said plunger from and holding it out of engagement with the notched wheel.

4. In a reel, the combination of a spool, a driving gear-train therefor, a crank, and a clutch mounted on the crank and normally inoperative to connect the crank with the gear-train, said clutch embodying a rotarily-mounted cam of limited angular movement on the crank.

5. In a reel, the combination of a spool, a crank for rotating the same, a post extending transversely to the crank at its free end, a handle mounted on the post, and a clutch embodying a notched wheel whose axis coincides with the axis of the crank-hub, a cam-sleeve secured to the handle, a cam rigid with the sleeve, a plunger interposed between the cam and the notched wheel, and a spring for withdrawing said plunger from and holding it out of engagement with the notched wheel.

6. In a multiplying-reel, the combination of a spool, a gear rigid therewith, a gear of larger diameter meshing with the same, a notched wheel, a shaft to which said larger gear and said notched wheel are secured, a crank rotatably mounted on said shaft, a post at the free end of the crank extending transversely thereto, a cam-sleeve mounted on said post, a handle secured to said sleeve, a cam rigid with the cam-sleeve, a stop to limit the angular movement of the cam, cam-sleeve and handle, and a spring-pressed plunger interposed between the cam and the notched wheel.

In testimony whereof we have signed our names to this specification in the presence of two subscribing witnesses.

ASHER KLEINMAN.
HUGO TOLKE.

Witnesses:
P. L. WELLS,
CHAS. H. DAVIDS.